US008447911B2

(12) United States Patent
Burger et al.

(10) Patent No.: US 8,447,911 B2
(45) Date of Patent: May 21, 2013

(54) UNORDERED LOAD/STORE QUEUE

(75) Inventors: Douglas C. Burger, Austin, TX (US); Stephen W. Keckler, Austin, TX (US); Robert McDonald, Austin, TX (US); Lakshminarasimhan Sethumadhavan, Austin, TX (US); Franziska Roesner, Austin, TX (US)

(73) Assignee: Board of Regents, University of Texas System, Austin, TX (US)

( * ) Notice: Subject to any disclaimer, the term of this patent is extended or adjusted under 35 U.S.C. 154(b) by 796 days.

(21) Appl. No.: 12/166,491

(22) Filed: Jul. 2, 2008

(65) Prior Publication Data
US 2009/0013135 A1 Jan. 8, 2009

Related U.S. Application Data

(60) Provisional application No. 60/948,122, filed on Jul. 5, 2007.

(51) Int. Cl.
*G06F 12/00* (2006.01)
*G06F 13/00* (2006.01)
*G06F 13/28* (2006.01)

(52) U.S. Cl.
USPC ................ 711/5; 712/206; 712/219; 712/225

(58) Field of Classification Search
USPC .............................. 711/5; 712/206, 219, 225
See application file for complete search history.

(56) References Cited

U.S. PATENT DOCUMENTS

| 5,421,022 | A | * | 5/1995 | McKeen et al. ................. 712/23 |
| 5,467,473 | A | | 11/1995 | Kahle et al. ..................... 395/800 |
| 5,931,957 | A | | 8/1999 | Konigsburg et al. |
| 6,108,770 | A | * | 8/2000 | Chrysos et al. ................ 712/216 |
| 6,141,747 | A | | 10/2000 | Witt ............................... 712/225 |
| 6,360,314 | B1 | * | 3/2002 | Webb et al. .................... 712/219 |
| 6,393,536 | B1 | * | 5/2002 | Hughes et al. ................. 711/159 |
| 6,591,342 | B1 | * | 7/2003 | Akkary et al. ................. 711/125 |
| 7,073,043 | B2 | * | 7/2006 | Arimilli et al. ................ 711/207 |
| 2003/0033276 | A1 | | 2/2003 | Cheng et al. |
| 2004/0003170 | A1 | | 1/2004 | Gibson et al. |
| 2008/0133883 | A1 | | 6/2008 | Glew |

OTHER PUBLICATIONS

Alper Buyuktosunoglu, et al., "Tradeoffs in Power-Efficient Issue Queue Design," ISLPED '02 (Aug. 2002).
International Search Report mailed Oct. 7, 2008 in PCT/US2008/069207.
Written Opinion mailed Oct. 7, 2008 in PCT/US2008/069207.
International Preliminary Report on Patentability mailed Jan. 5, 2010 in PCT/US2008/069207.

* cited by examiner

*Primary Examiner* — Stephen Elmore
*Assistant Examiner* — Mark Giardino, Jr.
(74) *Attorney, Agent, or Firm* — Schwabe, Williamson & Wyatt, P.C.

(57) ABSTRACT

A method and processor for providing full load/store queue functionality to an unordered load/store queue for a processor with out-of-order execution. Load and store instructions are inserted in a load/store queue in execution order. Each entry in the load/store queue includes an identification corresponding to a program order. Conflict detection in such an unordered load/store queue may be performed by searching a first CAM for all addresses that are the same or overlap with the address of the load or store instruction to be executed. A further search may be performed in a second CAM to identify those entries that are associated with younger or older instructions with respect to the sequence number of the load or store instruction to be executed. The output results of the Address CAM and Age CAM are logically ANDed.

27 Claims, 8 Drawing Sheets

UNORDERED LOAD/STORE QUEUE

CROSS-REFERENCE TO RELATED APPLICATIONS

This application is related to the following commonly owned co-pending U.S. patent application:

Provisional Application Ser. No. 60/948,122, "Method and Apparatus for Enabling Unordered Load-Store Queues," filed Jul. 5, 2007, and claims the benefit of its earlier filing date under 35 U.S.C. §119(e).

STATEMENT REGARDING GOVERNMENT SPONSORED RESEARCH OR DEVELOPMENT

This invention was made with government support under F30602-03-C-4106 awarded by The Air Force Research Lab. The government has certain rights in the invention.

TECHNICAL FIELD

The present invention relates to load/store queues, and more particularly to an unordered load/store queue for a processor with out-of-order execution.

BACKGROUND OF THE INVENTION

A conventional processor in an information handling system may include several pipeline stages to increase the effective throughput of the processor. For example, the processor may include a fetch stage that fetches instructions from memory, a decoder stage that decodes instructions into opcodes and operands, and an execution stage with various execution units that execute decoded instructions. Pipelining enables the processor to obtain greater efficiency by performing these processor operations in parallel. For example, the decoder stage may decode a fetched instruction while the fetch stage fetches the next instruction. Similarly, an execution unit in the execution stage may execute a decoded instruction while the decoder stage decodes another instruction.

The simplest processors processed instructions in program order, namely the order that the processor encounters instructions in a program. Processor designers increased processor efficiency by designing processors that execute instructions out-of-order. Designers found that a processor can process instructions out of program order provided the processed instruction does not depend on a result not yet available, such as a result from an earlier instruction. In other words, a processor can execute an instruction out-of-order provided that instruction does not exhibit a dependency.

To enable a processor to execute instructions out-of-order, the processor may include a "load/store queue." With the load/store queue, load and store instructions are able to be executed in order relative to one another. Entries in the load/store queue may be established for load and store instructions in program order as the instructions are fetched. For example, as a new load or store instruction is fetched, an entry is created for that load or store instruction at the tail end of the load/store queue. The load/store queue continues to hold this instruction until it has been committed (i.e., irrevocable) or nullified through misspeculation. Hence, the load/store queue holds each load and store instruction that are currently in-flight until that particular load or store instruction has been committed or nullified through misspeculation.

As discussed above, the load and store instructions are stored in the load/store queue after they have been fetched. Once the load or store instruction is ready to be executed, there may be a search performed in the load/store queue to ensure that there would not be a violation in executing that load or store instruction. For example, if a load instruction is to be executed, a search may be performed in the load/store queue to locate older (referring to being fetched prior to the load instruction in question) store instructions to the same or overlapping address that have not been committed to determine if the correct data to be loaded has already been stored. In another example, if a store instruction is to be executed, a search may be performed in the load/store queue to locate any younger (referring to being fetched after the store instruction in question) load instructions to the same or overlapping address that have been executed. If that has occurred, all of the pipelines are flushed.

Since the load/store queue has to store all the load and store instructions from the time they have been fetched to the time they have been committed, the load/store queue has to be large in size to accommodate these load and store instructions. Hence, the load/store queue is not currently scalable by requiring to hold load and store instructions in program order from the time they have been fetched to the time they are committed.

However, if the load/store queue could be scaled smaller in size, then the area and power efficiency of the load/store queue may be improved.

BRIEF SUMMARY OF THE INVENTION

In one embodiment of the present invention, a method for providing full load/store queue functionality to an unordered load/store queue for a processor with out-of-order execution comprises inserting load and store instructions in one or more load/store queues in non-program order, where each entry in the one or more load/store queues comprises an identification corresponding to a program order.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWING

A better understanding of the present invention can be obtained when the following detailed description is considered in conjunction with the following drawings, in which.

DETAILED DESCRIPTION OF THE INVENTION

The present invention comprises a method and processor for providing full load/store queue functionality to an unordered load/store queue for a processor with out-of-order execution. In one embodiment of the present invention, load and store instructions are inserted in one or more load/store queues in execution order. Each entry in the load/store queue includes an identification corresponding to the program order. Conflict detection (e.g., determining if any violations occurred) in such an unordered load/store queue (which may include separate load and store queues) may be performed by using two content addressable memories. One content addressable memory, referred to herein as the "Address CAM," may include addresses of the load or store instructions executed. The other content addressable memory, referred to herein as the "Age CAM," may include the sequence number (i.e., the program order) of the load or store instructions executed. A search may be performed in the Address CAM for all addresses that are the same or overlap with the address of the load or store instruction to be executed. A further search may be performed in the Age CAM to identify those entries that are associated with younger or older instructions with respect to the sequence number of the load or store instruction to be executed. The output results of the Address CAM and Age CAM are logically ANDed. Since the entries in the Address CAM and the Age CAM are correlated, the loads and stores to the same address are physically co-located with one another thereby allowing address comparison and the ability to perform a conflict detection analysis.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
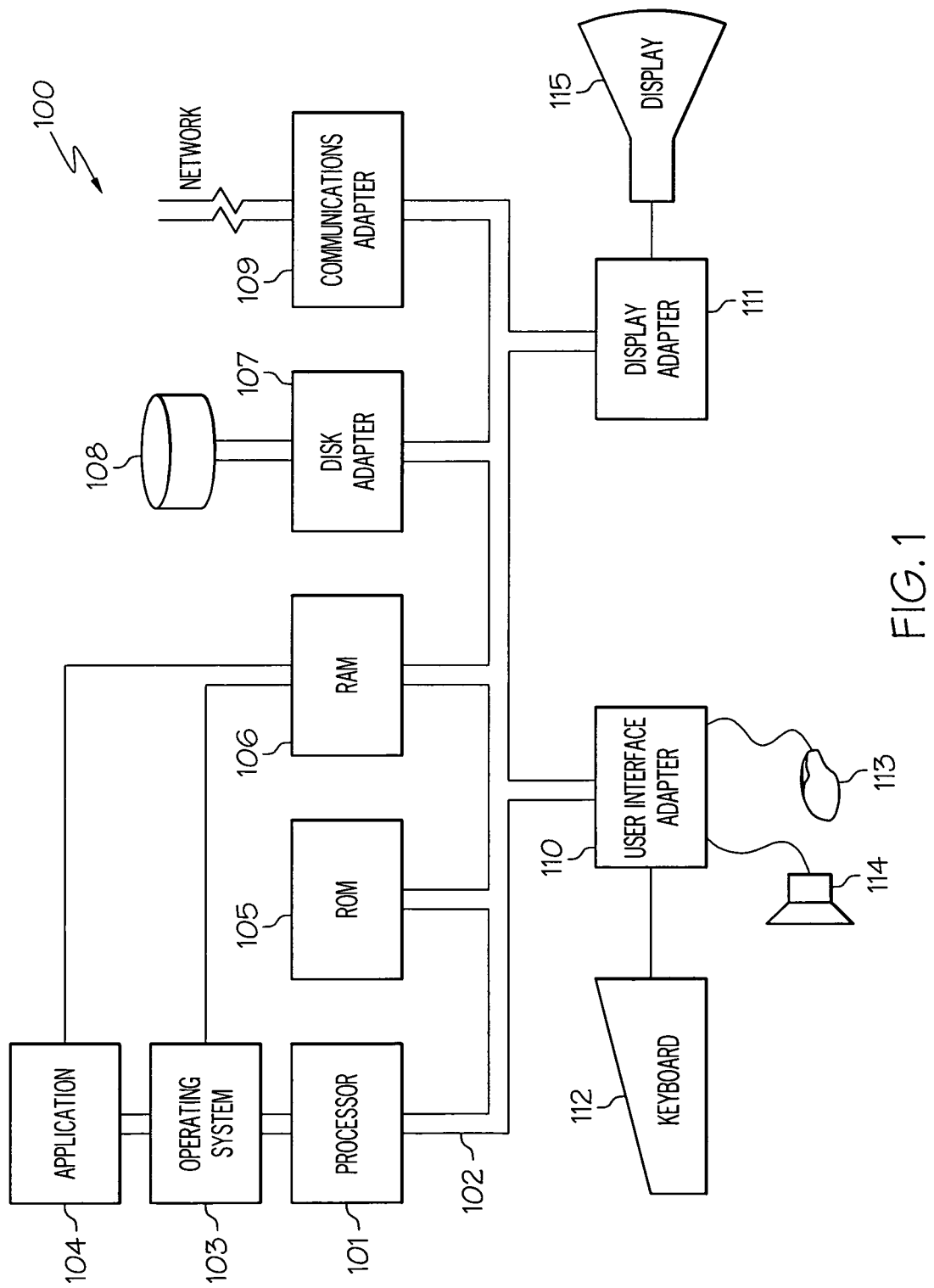
FIG. 1 is a hardware configuration of a computer system configured in accordance with an embodiment of the present invention.

FIG. 1—Hardware Configuration of Computer System

FIG. 1 illustrates an embodiment of a hardware configuration of computer system 100 which is representative of a hardware environment for practicing the present invention. Computer system 100 may have a processor 101 coupled to various other components by system bus 102. A more detailed description of processor 101 is provided below in connection with FIG. 2. Referring to FIG. 1, an operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104.

Referring to FIG. 1, read-only memory ("ROM") 105 may be coupled to system bus 102 and include a basic input/output system ("BIOS") that controls certain basic functions of computer device 100. Random access memory ("RAM") 106 and disk adapter 107 may also be coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive.

Referring to FIG. 1, computer system 100 may further include a communications adapter 109 coupled to bus 102. Communications adapter 109 may interconnect bus 102 with an outside network (not shown) thereby allowing computer system 100 to communicate with other similar devices.

I/O devices may also be connected to computer system 100 via a user interface adapter 110 and a display adapter 111. Keyboard 112, mouse 113 and speaker 114 may all be interconnected to bus 102 through user interface adapter 110. Data may be inputted to computer system 100 through any of these devices. A display monitor 115 may be connected to system bus 102 by display adapter 111. In this manner, a user is capable of inputting to computer system 100 through keyboard 112 or mouse 113 and receiving output from computer system 100 via display 115 or speaker 114.

The various aspects, features, embodiments or implementations of the invention described herein can be used alone or in various combinations. The methods of the present invention can be implemented by software, hardware or a combination of hardware and software.

As discussed above, a detail description of processor 101 is provided below in connection with FIG. 2.

FIG. 2—Processor

Figure 2:
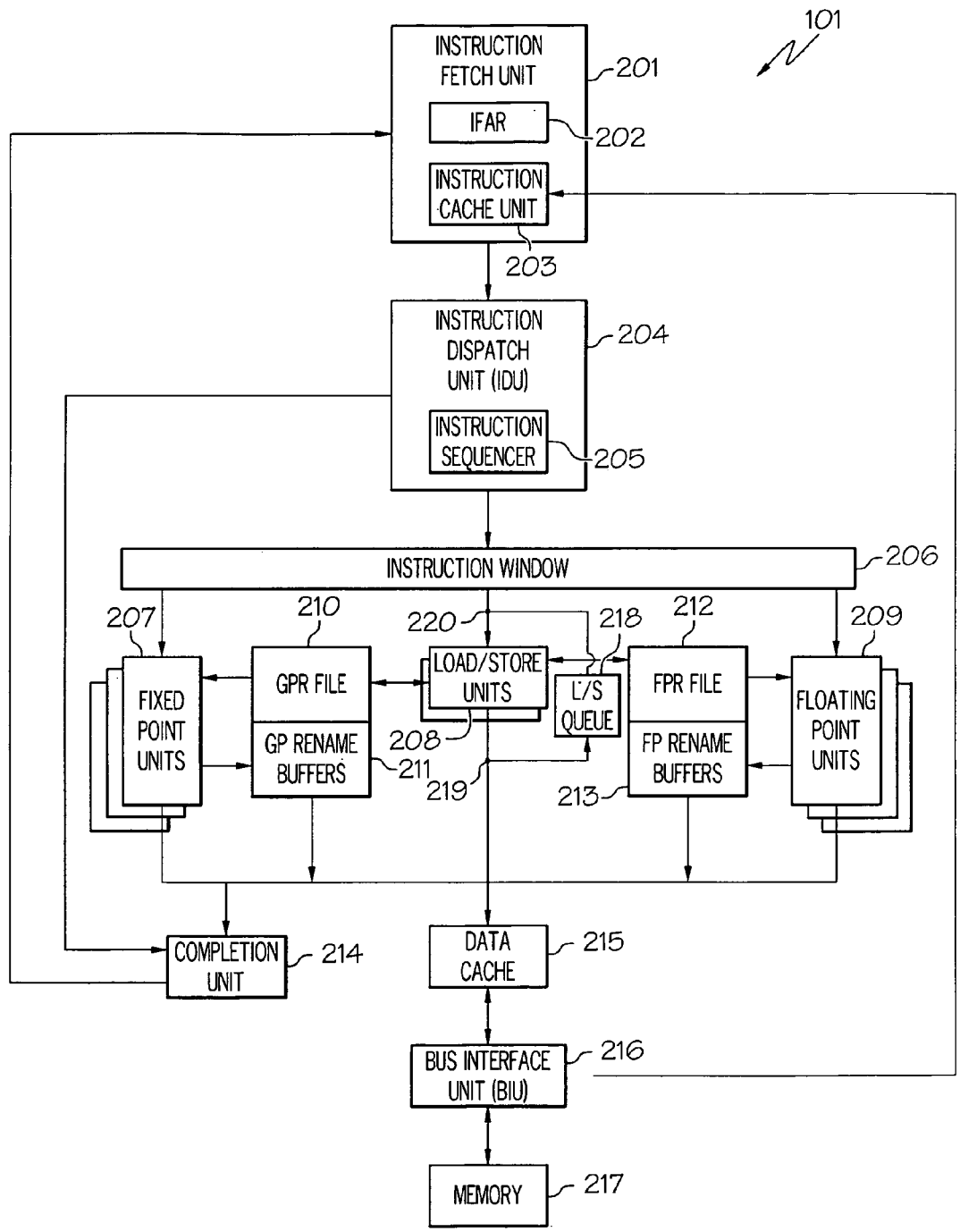
FIG. 2 illustrates an embodiment of the present invention of a processor of the computer system.

FIG. 2 illustrates an embodiment of the present invention of processor 101 (FIG. 1) configured to execute instructions out-of-order. Processor 101 may include an instruction fetch unit 201 configured to fetch an instruction in program order. Instruction fetch unit 201 may further be configured to load the address of the fetched instruction into Instruction Fetch Address Register 202 ("IFAR"). The address loaded into IFAR 202 may be an effective address representing an address from the program or compiler. The instruction corresponding to the received effective address may be accessed from Instruction Cache (I-Cache) unit 203 comprising an instruction cache (not shown) and a prefetch buffer (not shown). The instruction cache and prefetch buffer may both be configured to store instructions. Instructions may be inputted to instruction cache and prefetch buffer from a system memory 217 through a Bus Interface Unit (BIU) 216.

Instructions from I-Cache unit 203 may be outputted to Instruction Dispatch Unit (IDU) 204. IDU 204 may be configured to decode these received instructions. IDU 204 may further comprise an instruction sequencer 205 configured to forward the decoded instructions in an order determined by various algorithms. The out-of-order instructions may be forwarded to one of a plurality of issue queues, or what may be referred to as an "instruction window" 206, where a particular issue in instruction window 206 may be coupled to one or more particular execution units, fixed point units 207, load/store units 208 and floating point units 209. Instruction window 206 includes all instructions that have been fetched but are not yet committed. Each execution unit may execute one or more instructions of a particular class of instructions. For example, FXUs 207 may execute fixed point mathematical and logic operations on source operands, such as adding, subtracting, ANDing, ORing and XORing. FPUs 209 may execute floating point operations on source operands, such as floating point multiplication and division. FXUs 207 may input their source and operand information from General Purpose Register (GPR) file 210 and output their results (destination operand information) of their operations for storage at selected entries in General Purpose (GP) rename buffers 211. Similarly, FPUs 209 may input their source and operand information from Floating Point Register (FPR) file 212 and output their results (destination operand information) of their operations for storage at selected entries in Floating Point (FP) rename buffers 213.

As stated above, instructions may be queued in one of a plurality of issue queues in instruction window 206. If an instruction contains a fixed point operation, then that instruction may be issued by an issue queue of instruction window 206 to any of the multiple FXUs 207 to execute that instruction. Further, if an instruction contains a floating point operation, then that instruction may be issued by an issue queue of instruction window 206 to any of the multiple FPUs 209 to execute that instruction.

All of the execution units, FXUs 207, FPUs 209, LSUs 208, may be coupled to completion unit 214. Upon executing the received instruction, the execution units, FXUs 207, FPUs 209, LSUs 208, may transmit an indication to completion unit 214 indicating the execution of the received instruction. This information may be stored in a table (not shown) which may then be forwarded to IFU 201. Completion unit 214 may further be coupled to IDU 204. IDU 204 may be configured to transmit to completion unit 214 the status information (e.g., type of instruction, associated thread) of the instructions being dispatched to instruction window 206. Completion unit 214 may further be configured to track the status of these instructions. For example, completion unit 214 may keep track of when these instructions have been committed. Completion unit 214 may further be coupled to instruction window 206 and further configured to transmit an indication of an instruction being committed to the appropriate issue queue of instruction window 206 that issued the instruction that was committed.

In one embodiment, LSUs 208 may be coupled to a data cache 215. In response to a load instruction, LSU 208 inputs information from data cache 215 and copies such information to selected ones of rename buffers 211, 213. If such information is not stored in data cache 215, then data cache 215 inputs through Bus Interface Unit (BIU) 216 such information from system memory 217 connected to system bus 102 (FIG. 1). Moreover, data cache 215 may be able to output through BIU 216 and system bus 102 information from data cache 215 to system memory 217 connected to system bus 102. In response to a store instruction, LSU 208 may input information from a selected one of GPR file 210 and FPR file 212 and copy such information to data cache 215 when the store instruction commits.

Processor 101 is not limited in scope to any one particular embodiment. Further, the principles of the present invention are not confined in scope to any one particular type of processor architecture. The principles of the present invention apply to any processor architecture that includes a load/store queue.

Figure 3:
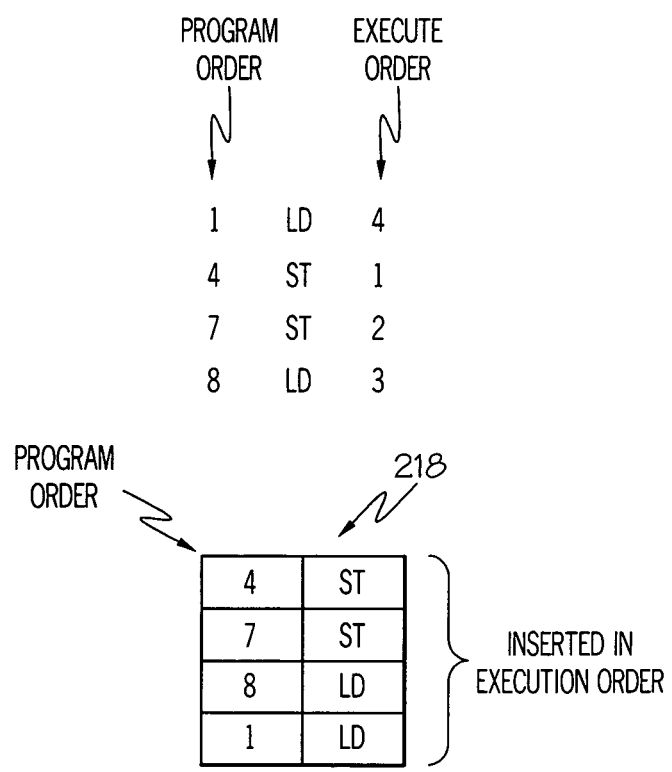
FIG. 3 illustrates storing instructions in execution order in a load/store queue in accordance with an embodiment of the present invention.

Referring to FIG. 1, processor 101 may include a load/store queue ("L/S queue") 218 configured to store load and store instructions in execution order and not in program order as illustrated in FIG. 3. FIG. 3 illustrates storing instructions in execution order in load/store queue 218 in accordance with an embodiment of the present invention. For example, referring to the top portion FIG. 3, suppose at fetch time, a load instruction (indicated as "LD" in FIG. 3) is assigned the sequence number (i.e., the position of the program order) of 1. To be clear, a sequence number is non-contiguous as other non-memory instructions may occur between these load and store instructions. A store instruction (indicated as "ST" in FIG. 3) is assigned the sequence number of 4. Another store instruction is assigned the sequence number of 7. Further, another load instruction is assigned the sequence number of 8. Suppose further that out of these instructions, the store instruction with the sequence number of 4 is executed first, followed by the store instruction with the sequence number of 7, followed by the load instruction with the sequence number of 8 followed by the load instruction with the sequence number of 1.

As illustrated in the bottom portion of FIG. 3, the load/store instructions are stored in load/store queue 218 in executed order where the store instruction executed first (store instruction with the sequence number of 4) is first enqueued followed by the store instruction with the sequence number of 7 followed by the load instruction with the sequence number of 8 followed by the load instruction with the sequence number of 1.

Load/store queue 218 may perform the following functions. One function is referred to as the "forwarding" function. When a younger load instruction arrives later than a store instruction to an overlapping address, typically the store instruction "forwards" its value to the load instruction, combining it with data from a cache (e.g., data cache 215) if necessary. The data from the cache should have a lower priority than the data being forwarded from a store instruction.

The second function is referred to as the "violation detection" function. When an older store instruction to an overlapping address arrives, it may detect that a younger load arrived earlier and has already executed. As a result, the load instruction received the incorrect data and the pipeline needs to be flushed, at least back to the load instruction and all younger instructions.

The third function is referred to as the "store buffering" function. When a store instruction executes, its value is buffered in load/store queue 218 until the store instruction commits, at which point the store's value is written to the cache (e.g., data cache 215).

As further illustrated in the bottom portion of FIG. 3, in one embodiment, load/store queue 218 may store the program order associated with the enqueued store or load instruction so as to test for violations and to give the perception of being ordered as will be discussed in further detail below in connection with FIGS. 5, 6A-B and 7.

Returning to FIG. 2, load/store queue 218 may include multiple queues, where one queue is designated to store load instructions and the other queue is designated to store instructions. While the following discusses load/store queue 218 as being a single unit, the principles of the present invention apply to a load/store queue that includes separate queues for storing the load and store instructions. In one embodiment, the load and store instructions may be loaded into load/store queue 218 at the time the effective addresses are computed, such as at point 219 in FIG. 2. In another embodiment, the load and store instructions are loaded into load/store queue 218 when the instructions are issued, such as at point 220 in FIG. 2. Since the load and store instructions are enqueued in load/store queue 218 when effective addresses are computed or when the instructions are issued and are not enqueued as the instructions are fetched, there is a delay in inserting the instructions which allows the load/store queue to be smaller in size. As a result, processor performance and power efficiency is improved.

Load/store queue 218 may further be scaled by dividing load/store queue 218 into a plurality of banks as discussed below in connection with FIG. 4.

Figure 4:
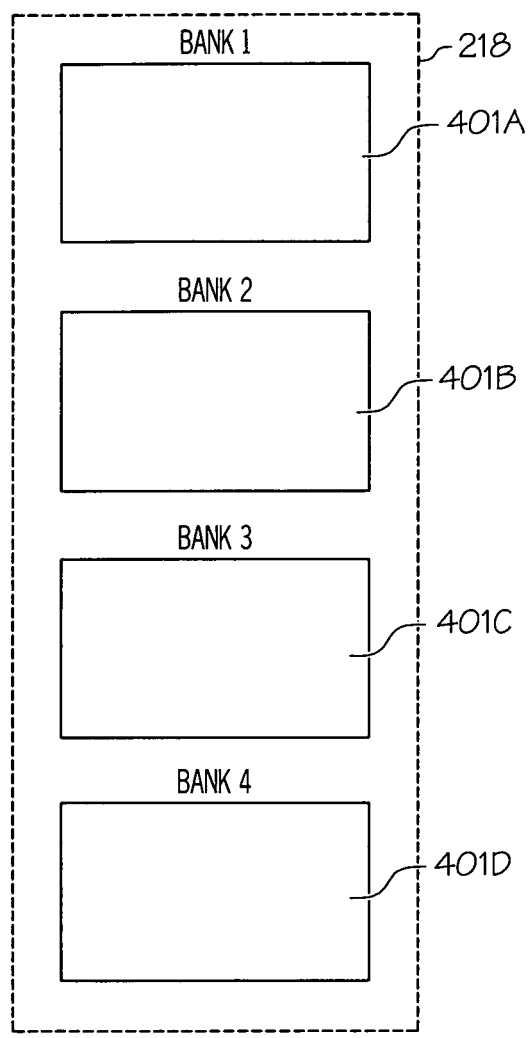
FIG. 4 illustrates an embodiment of the present invention of the load/store queue.

FIG. 4—Load/Store Queue

FIG. 4 illustrates an embodiment of the present invention of load/store queue 218 (FIG. 2). Load/store queue 218 may include a plurality of banks 401A-D, where each bank may be configured to store load and store instructions over a range of addresses. Banks 401A-D may collectively or individually be referred to as banks 401 or bank 401, respectively. For example, an address of a load or store instruction may be used to determine which bank 401 to store that load or store instruction. For instance, all load and store instructions to the same address are sent to the same bank. In one embodiment, the address of the load or store instruction may be used in a hash function to determine which bank 401 to store the load or store instruction. Load/store queue 218 may include any number of banks 401. Load/store queue 218 is not confined in scope to the embodiment disclosed in FIG. 4. As a result of partitioning load/store queue 218 into banks 401, the load/store queue can be smaller and faster and more energy efficient.

Figure 5:
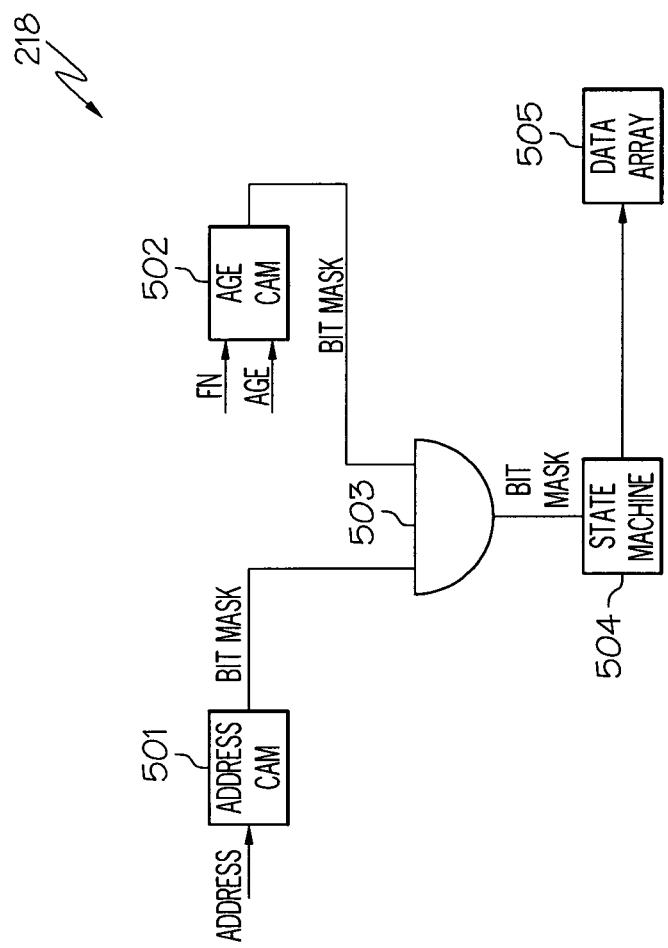
FIG. 5 illustrates the internal architecture of the load/store queue in accordance with an embodiment of the present invention.
Figure 6A:
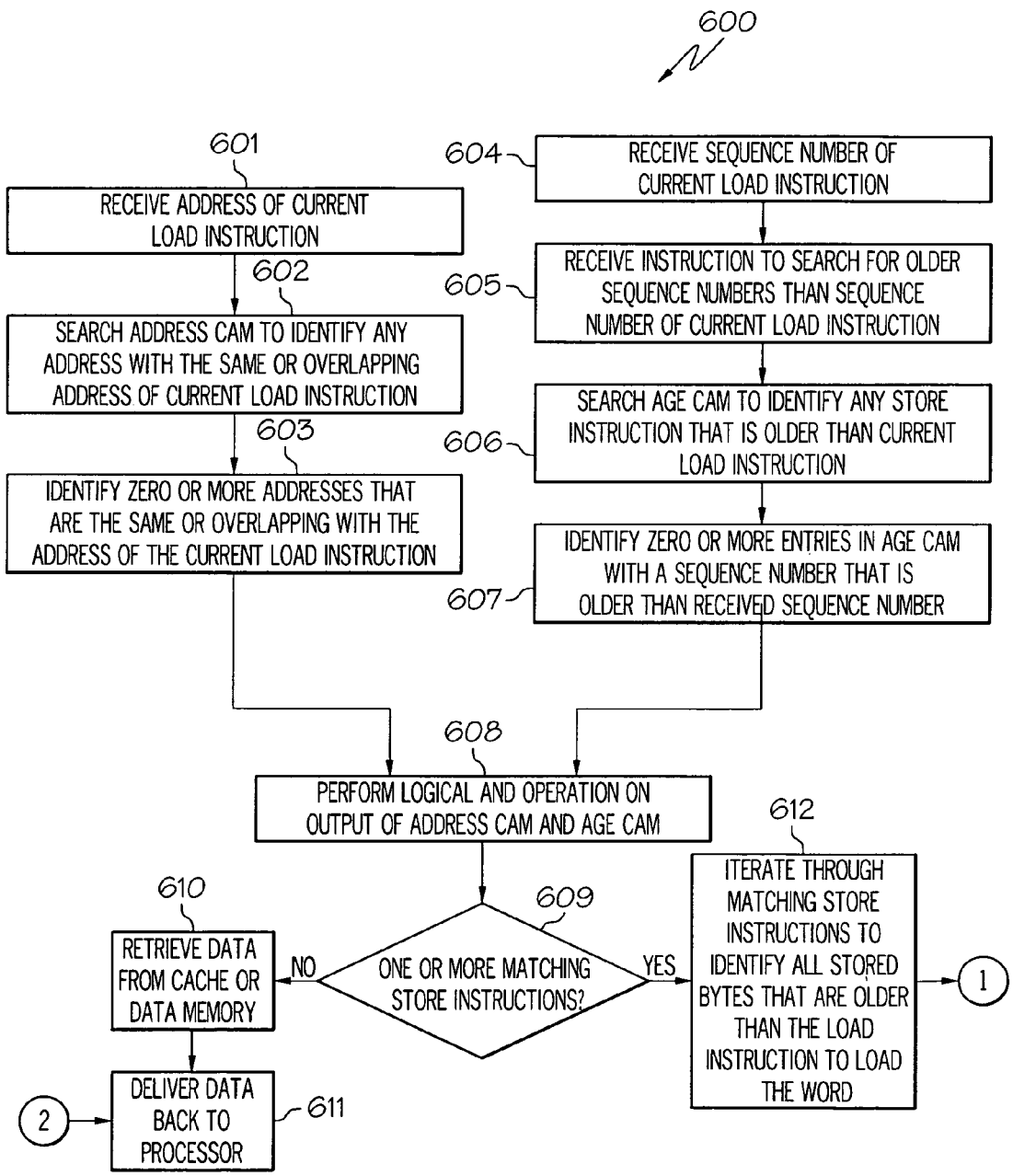
FIGS. 6A-B are a flowchart of a method for providing full load/store queue functionality to an unordered load/store queue in connection with arriving load instructions for a processor executing instructions out-of-order in accordance with an embodiment of the present invention.
Figure 6B:
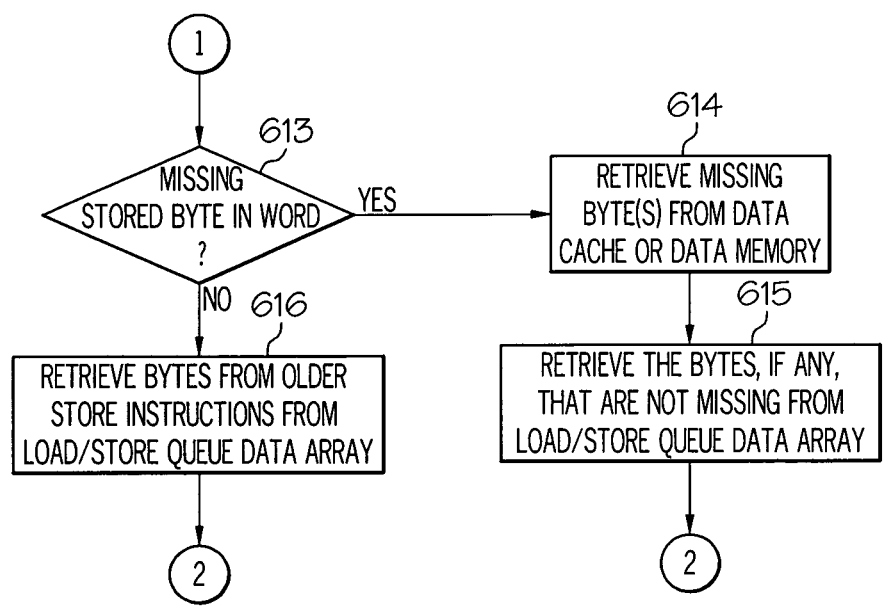
Figure 7:
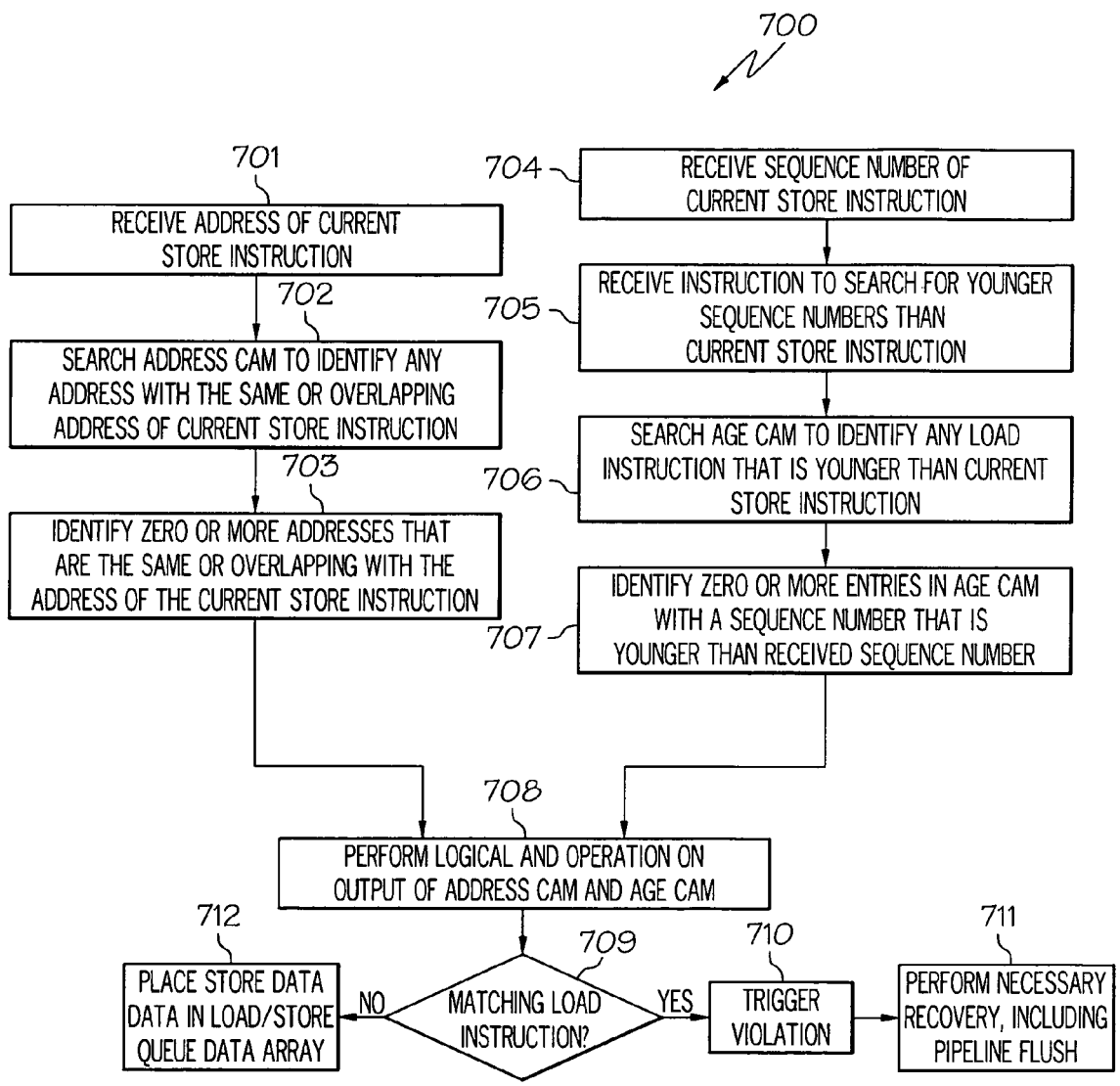
FIG. 7 is a flowchart of a method for providing full load/store queue functionality to an unordered load/store queue in connection with arriving store instructions for a processor executing instructions out-of-order in accordance with an embodiment of the present invention.

However, conflict detection still needs to be performed to determine if there any violations in executing a load or store instruction. For example, a load instruction to a particular address should not be executed if there are unissued older store instructions that will overlap in the addresses. A discussion of handling conflict detection using the unordered load/store queue 218 is provided below in connection with FIGS. 5, 6A-B and 7. FIG. 5 illustrates the internal architecture of load/store queue 218 in accordance with an embodiment of the present invention. FIGS. 6A-B are a flowchart of a method for providing full load/store queue functionality to an unordered load/store queue in connection with arriving load instructions for a processor with out-of-order execution. FIG. 7 is a flowchart of a method for providing full load/store queue functionality to an unordered load/store queue in connection with arriving store instructions for a processor with out-of-order execution.

FIG. 5—Internal Architecture of Load/Store Queue

FIG. 5 illustrates the internal architecture of load/store queue 218 in accordance with an embodiment of the present invention. Referring to FIG. 5, load/store queue 218 may include a content-addressable memory 501 referred to herein as "Address CAM." In one embodiment, Address CAM 501 may include the addresses of the load or store instructions executed. Address CAM 501 may be configured to receive the address of the current load or store instruction to be executed. Address CAM 501 may further be configured to search its entire memory to determine if that address (or an address that contains that address) is stored anywhere in it. If the same or overlapping address is found, then Address CAM 501 returns a bit mask which identifies the entries in Address CAM 501 that contain the same or overlapping address of the address of the load or store instruction to be executed.

Load/store queue 218 may further include a second content-addressable memory 502, referred to herein as "Age CAM." In one embodiment, Age CAM 502 may include the sequence number (i.e., the program order) of the load or store instructions executed. Age CAM 501 may be configured to receive the sequence number (i.e., the program order) of the current load or store instruction to be executed (identified as "age" in FIG. 5) as well as an indication as to whether younger or older instructions with respect to the provided sequence number are to be searched (indicated as "fn" for function in FIG. 5). For example, if a load instruction is to be executed, then the nearest oldest address of a store instruction for the same or overlapping address may need to be identified in order to determine if the data to be loaded is the latest or not. In another example, if a store instruction is to be executed, then younger executed load instructions to the same or overlapping address need to be identified to determine if incorrect data was previously loaded thereby resulting in the flushing of the pipelines.

Age CAM 502 may be configured to search its entire memory to determine if younger or older sequence numbers (based on whether Age CAM 502 is to search for younger or older sequence numbers than the sequence number provided) is stored anywhere in it. Age CAM 502 returns a bit mask which identifies the entries in Age CAM 502 that contain zero or more younger or older sequence numbers than the sequence number provided.

The output of Address CAM 501 and the output of Age CAM 502 are logically ANDed by logical AND gate 503. The bit mask outputted by AND gate 503 may be stored in a register (not shown) in state machine 504 (discussed further below). In one embodiment, the entries in Address CAM 501 and Age CAM 502 are correlated meaning that the first entry in Address CAM 501 that stores an address corresponds to the same instruction whose age is stored in the first entry in Age CAM 502. As a result, the load and store to the same address is physically co-located with one another which allows address comparison and the ability to perform a conflict detection analysis (e.g., to determine if a violation has occurred). By logically ANDing the output of Address CAM 501 and Age CAM 502, a conflict detection analysis is performed on the appropriate load or store instructions by a state machine 504 which is discussed in further detail below in connection with FIGS. 6A-B and FIG. 7. State machine 504 may be implemented via hardware, software, or a combination of hardware and software. State machine 504 may be configured to retrieve data from an appropriate entry in data array 505 as discussed further below in connection with FIGS. 6A-B.

While the foregoing has described load/store queue 218 as including two separate content addressable memories, the principles of the present invention may applied to a single content addressable memory that performs the functions of Address CAM 501 and Age CAM 502.

FIGS. 6A-B—Method for Providing Full Load/Store Queue Functionality to an Unordered Load/Store Queue in Connection with Arriving Load Instructions FIGS. 6A-B are a flowchart of a method 600 for providing full load/store queue functionality to an unordered load/store queue 218 (FIGS. 2-5) in connection with arriving load instructions for a processor with out-of-order execution in accordance with an embodiment of the present invention.

Referring to FIG. 6A, in conjunction with FIGS. 2 and 5, in step 601, an address of the current load instruction to be executed is received.

In step 602, a search is performed in Address CAM 501 to identify any address with the same or overlapping address of the current load instruction to be executed.

In step 603, zero or more entries in Address CAM 501 are identified with an address that is the same or overlapping with the address of the current load instruction to be executed.

In one embodiment, steps 604-607 are simultaneously executed in parallel with the searching in Address CAM 501 (steps 601-603).

Referring to FIG. 6A, in conjunction with FIGS. 2 and 5, in step 604, a sequence number of the current load instruction to be executed is received. In step 605, an instruction to search for older sequence numbers than the received sequence number is received.

In step 606, a search is performed in Age CAM 502 to identify any entries with a sequence number that are older than the received sequence number. That is, a search is performed in Age CAM 502 to identify any store instructions that are older than the current load instruction.

In step 607, zero or more entries in Age CAM 502 are identified with a sequence number that are older than the received sequence number.

In step 608, a logical AND operation is performed on the output of Address CAM 501 and the output of Age CAM 502.

State machine 504 performs the following analysis to perform the functions of load/store queue 218 as previously discussed.

In step 609, state machine 504 determines whether there are one or more matching store instructions. For example, there may have been no entries identified in Address CAM 501 with the same or overlapping address as the address of the load instruction to be executed. Further, if the search finds no matching store instructions, then there is no forwarding of data from the store instructions in load/store queue 218 to the load instruction. When no matching store is found, state machine 504, in step 610, retrieves the data from the appropriate entry from data cache 215 or from memory 217.

In step 611, state machine 504 delivers the data back to processor 101.

If, however, one or more matching store instructions were identified, then, in step 612, state machine 504 iterates through the matching store instructions to identify all the stored bytes of a word that are older than the load instruction to load the word.

For example, suppose a load instruction is to be executed to load data from address x. Suppose further that state machine 504 determines that the only uncommitted older store to address x has its address stored in entry #3 in Address CAM 501 and its sequence number stored in entry #3 in Age CAM 502. State machine 504 may then retrieve the data stored in entry #3 from data array 505.

In another example, suppose that a load instruction is to load a word beginning at address x. One may need to know if data has been stored at each of the four bytes beginning at address x (e.g., x, x+1, x+2 and x+3, where x corresponds to the first byte of the word; x+1 corresponds to the second byte of the word; x+2 corresponds to the third byte of the word; and x+3 corresponds to the fourth byte of the word). If there are uncommitted stores to a portion of the bytes of the word (e.g., older stores to bytes x, x+2 and x+3 have been committed), then the missing bytes of data (e.g., x+1) may have to be retrieved from memory (e.g., data cache 215). As discussed above in connection with step 602 of FIG. 6A, Address CAM 501 is searched for the same or overlapping address of the address of the current load instruction. If the word load instruction was the current load instruction, then a search may be performed in Address CAM 501 for the same address (e.g., address x) and the overlapping addresses (e.g., addresses x+1, x+2 and x+3). The above analysis regarding overlaps with older uncommitted stores may be performed for each byte in the word to be loaded. It is noted that the load instruction is not limited to loading a word of four bytes. For example, the word to be loaded may be a half-word, a quad-word, etc. Further, state machine 504 may be configured in step 612 to match the corresponding types of prior stores (e.g., half-word, quad-word) to the loaded word.

Referring to FIG. 6B, in step 613, state machine 504 determines whether there are any missing stored bytes in the word. If there are missing stored bytes in the word, then, in step 614, state machine 504 retrieves the missing bytes from a data memory or from data cache 215. Further, in step 615, state machine 504 retrieves the bytes, if any, that are not missing from load/store queue data array 505. State machine 504 may then deliver the data back to processor 101 in step 611.

If, however, there no missing bytes, then, in step 616, state machine 504 retrieves the bytes from the older store instructions from load/store queue data array 505. State machine 504 may then deliver the data back to processor 101 in step 611.

Further, for systems that require program ordering between two load instructions to the same address, method 600 may be extended to check for load-load ordering violations and trigger recovery in a similar fashion as discussed below in connection with method 700.

Method 600 may include other and/or additional steps that, for clarity, are not depicted. Further, method 600 may be executed in a different order presented and that the order presented in the discussion of FIGS. 6A-B is illustrative. Additionally, certain steps in method 600 may be executed in a substantially simultaneous manner or may be omitted.

As discussed above, the method for providing full load/store queue functionality to unordered load/store queue 218 in connection with arriving store instructions is provided below in connection with FIG. 7.

FIG. 7—Method for Providing Full Load/Store Queue Functionality to an Unordered Load/Store Queue in Connection with Arriving Store Instructions FIG. 7 is a flowchart of a method 700 for providing full load/store functionality to an unordered load/store queue 218 (FIGS. 2-5) in connection with arriving store instructions for a processor with out-of-order execution in accordance with an embodiment of the present invention.

Referring to FIG. 7, in conjunction with FIGS. 2 and 5, in step 701, an address of the current store instruction to be executed is received.

In step 702, a search is performed in Address CAM 501 to identify any address with the same or overlapping address of the current store instruction to be executed.

In step 703, zero or more entries in Address CAM 501 are identified with an address that is the same or overlapping with the address of the current store instruction to be executed.

In one embodiment, steps 704-707 are simultaneously executed in parallel with the searching in Address CAM 501 (steps 701-703).

Referring to FIG. 7, in conjunction with FIGS. 2 and 5, in step 704, a sequence number of the current store instruction to be executed is received. In step 705, an instruction to search for younger sequence numbers than the received sequence number is received.

In step 706, a search is performed in Age CAM 502 to identify any entries with a sequence number that are younger than the received sequence number. That is, a search is performed in Age CAM 502 to identify any load instructions that are younger than the current load instruction.

In step 707, zero or more entries in Age CAM 502 are identified with a sequence number that are younger than the received sequence number.

In step 708, a logical AND operation is performed on the output of Address CAM 501 and the output of Age CAM 502.

State machine 504 performs the following analysis to perform the functions of load/store queue 218 as previously discussed.

In step 709, state machine 504 determines whether there is a matching load instruction.

If there is a matching load instruction, then, in step 710, state machine 504 triggers a violation. For example, if a younger load instruction was executed prior to the store instruction being executed, then a violation has occurred as incorrect data was loaded. In step 711, state machine 504 performs the appropriate action to handle the violation, such as by flushing the processor pipelines of at least the violating load instruction and everything younger, including the contents of load/store queue 218.

If, however, there is no matching load instruction, then, in step 712, state machine 504 places the stored data in load/store queue data array 505.

Method 700 may include other and/or additional steps that, for clarity, are not depicted. Further, method 700 may be executed in a different order presented and that the order presented in the discussion of FIG. 7 is illustrative. Additionally, certain steps in method 700 may be executed in a substantially simultaneous manner or may be omitted.

Although the method and processor are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for comprising:
   fetching instructions of a program from an instruction storage, and staging fetched instructions in a dispatch store for issuing, wherein the program comprises a plurality of instructions, including a plurality of load or store instructions;
   issuing staged instructions from the dispatch store out-of-program-order to one or more execution units of a processor for out-of-program-order execution, wherein the issuing includes inserting in execution order, which is out-of-program-order, load or store instructions being issued into one or more combined load/store queues for staging issued load and store instructions for execution, wherein each combined load/store queue is configured to store load instructions and store instructions;
   searching a memory of the one or more combined load/store queues to identify any address with one of a same address or an overlapping address of one of a load instruction or a store instruction to be executed;
   searching said memory to identify any sequence numbers that are one of younger or older than a sequence number of one of said load instruction or said store instruction to be executed, wherein a sequence number of a load or store instruction comprises a program location of the load or store instruction in the program in program order; and
   performing a logical AND function on outputs of said searches.

2. The method of claim 1,
   wherein at least a first of the load or store instructions inserted into said one or more load/store queues in execution order, which is out-of-program-order, comprises an identification corresponding to a program location of the first load or store instruction in the program in program order.

3. The method as recited in claim 1, wherein inserting comprises inserting load or store instructions being issued in said one or more combined load/store queues, as addresses associated with the load or store instructions being issued are computed.

4. The method as recited in claim 1, wherein said one or more combined load/store queues comprise a plurality of banks, and wherein inserting the first load or store instruction includes selecting a bank of said plurality of banks according to one or more bits of an address associated with the first load or store instruction.

5. The method as recited in claim 1 further comprising:
   identifying zero or more entries in said memory with one of said same address or said overlapping address of one of said load instruction or said store instruction to be executed.

6. The method as recited in claim 1 further comprising:
   receiving a sequence number of one of a load instruction or a store instruction to be executed, the sequence number comprising the program location of the load or store instructions in the program in program order.

7. The method as recited in claim 6 further comprising:
   receiving an instruction to search in a memory of the one or more combined load/store queues for one of younger sequence numbers or older sequence numbers than said received sequence number.

8. The method as recited in claim 1 further comprising:
   triggering a violation by identifying a matching younger load instructions for a search instigated by a store instruction.

9. The method as recited in claim 1 further comprising:
   iterating through store instructions in the one or more combined load/store queues to identify queued stored bytes applicable to a word of a load instruction in the one or more combined load/store queues.

10. The method as recited in claim 9 further comprising:
    retrieving missing one or more bytes of said word from one of a data memory or a data cache.

11. The method as recited in claim 9 further comprising:
    retrieving one or more bytes from one or more older store instructions from a data array in said one or more load/store queues.

12. The method as recited in claim 1,
    wherein the memory of the one or more combined load/store queues comprises first and second memory;
    wherein searching a memory of the one or more combined load/store queues to identify any address with one of a same address or an overlapping address of one of a load instruction or a store instruction to be executed comprises searching a first memory of the one or more combined load/store queues to identify any address with one of a same address or an overlapping address of one of a load instruction or a store instruction to be executed,
    searching said memory to identify any sequence numbers that are one of younger or older than a sequence number of one of said load instruction or said store instruction to be executed, comprises searching a second memory of the one or more combined load/store queues to identify any sequence numbers that are one of younger or older than a sequence number of one of said load instruction or said store instruction to be executed.

13. The method as recited in claim 12 further comprising:
    triggering a violation by identifying a matching younger load instructions for a search instigated by a store instruction.

14. The method as recited in claim 12 further comprising:
    iterating through store instructions in the one or more combined load/store queues to identify queued stored bytes of a word applicable to a load instruction in the one or more combined load/store queues.

15. The method as recited in claim 14 further comprising:
    retrieving missing one or more bytes of said word from one of a data memory or a data cache.

16. The method as recited in claim 14 further comprising:
retrieving one or more bytes from one or more older store instructions from a data array in said one or more load/store queues.

17. A processor comprising:
one or more execution units to execute instructions;
a dispatcher unit configured to stage fetched instructions of a program, and issue staged instructions to the one or more execution units for execution, wherein the program comprises a plurality of instructions, including a plurality of load or store instructions, and the staged instructions are issued to the one or more execution units out of program order; and
one or more combined load/store queues coupled to the one or more execution units and the dispatcher unit, and configured to store issued load and store instructions, wherein the one or more combined load/store queues are further configured to enable load or store instructions being issued to be inserted into the one ore more load/store queues in execution order, which is out-of-program order, and wherein said one or more combined load/store queues comprises a memory configured to store destination addresses and sequence numbers of the load or store instructions, wherein each combined load/store queue is configured to store load instructions and store instructions, and wherein the sequence number of a load or store instruction comprises a program location of the load or store instruction in the program in program order;
wherein said one or more combined load/store queues comprises a gate configured to perform a logical AND function on outputs of a first search and a second search, wherein the first search is performed on said memory to identify any address with one of a same address or an overlapping address of one of a load instruction or a store instruction to be executed, and wherein the second search is performed on said memory to identify any sequence numbers that are one of younger or older than a sequence number of one of a load instruction and a store instruction to be executed.

18. The processor as recited in claim 17, wherein said one or more combined load/store queues comprises:
a state machine coupled to said gate, wherein said state machine is configured to trigger a violation by identifying a matching younger load instructions for a search instigated by a store instruction.

19. The processor as recited in claim 17, wherein said one or more combined load/store queues comprises:
a state machine coupled to said gate, wherein said state machine is configured to iterate through matching store instructions to identify all stored bytes of a word that are older than an address of a load instruction to load said word.

20. The processor as recited in claim 19, wherein said state machine is further configured to retrieve missing one or more bytes of said word from one of a data memory or a data cache.

21. The processor as recited in claim 19, wherein said state machine is further configured to retrieve one or more bytes from one or more older store instructions from a data array in said one or more load/store queues.

22. The processor as recited in claim 17, wherein said one or more combined load/store queues comprises:
a first memory configured to store addresses of executed load or store instructions; and
a second memory configured to store sequence numbers of executed load or store instructions.

23. The processor as recited in claim 22, wherein said one or more combined load/store queues comprises:
a state machine coupled to said gate, wherein said state machine is configured to trigger a violation by identifying a matching younger load instructions for a search instigated by a store instruction.

24. The processor as recited in claim 22, wherein said one or more combined load/store queues comprises:
a state machine coupled to said gate, wherein said state machine iterates through matching store instructions to identify all stored bytes of a word that are older than an address of a load instruction to load said word.

25. The processor as recited in claim 24, wherein said state machine is further configured to retrieve missing one or more bytes of said word from one of a data memory or a data cache.

26. The processor as recited in claim 24, wherein said state machine is further configured to retrieve one or more bytes from one or more older store instructions from a data array in said one or more load/store queues.

27. A processor comprising:
first means for executing instructions; and
second means for enabling instructions of a program, including one or more load or store instructions, to be issued out-of-program-order to said first means for out-of-program-order execution, wherein the second means are configured to store load and store instructions in a combined intermixed manner, wherein the second means are further configured to enable the load or store instructions to be inserted into the second means in execution order, which is out-of-program-order, and wherein said second means further comprises a gate configured to perform a logical AND function on outputs of a first search and a second search, wherein the first search is performed on to identify any address with one of a same address or an overlapping address of one of a load instruction or a store instruction stored in the second means to be executed, and wherein the second search is performed to identify any load or store instructions with sequence numbers that are one of younger or older than a sequence number of one of a load instruction or a store instruction stored in the second means to be executed, wherein each combined load/store queue is configured to store load instructions and store instructions, and wherein the sequence number of a load or store instruction comprises a program location of the load or store instruction in the program.

* * * * *

UNITED STATES PATENT AND TRADEMARK OFFICE
CERTIFICATE OF CORRECTION

| | | |
|---|---|---|
| PATENT NO. | : 8,447,911 B2 | Page 1 of 1 |
| APPLICATION NO. | : 12/166491 | |
| DATED | : May 21, 2013 | |
| INVENTOR(S) | : Burger et al. | |

It is certified that error appears in the above-identified patent and that said Letters Patent is hereby corrected as shown below:

In the Specifications

In Column 1, Line 47, delete "out of program order" and insert -- out-of-program-order --, therefor In Column 2, Line 47, delete "DRAWING" and insert -- DRAWINGS --, therefor.

In the Claims

In Column 12, Line 47, in Claim 12, delete "executed," and insert -- executed; --, therefor.

In Column 13, Line 13, in Claim 17, delete "out of program order;" and insert -- out-of-program-order; --, therefor.

In Column 13, Line 19, in Claim 17, delete "ore" and insert -- or --, therefor.

Signed and Sealed this
Twenty-fifth Day of March, 2014

Michelle K. Lee
*Deputy Director of the United States Patent and Trademark Office*